US008587907B2

(12) United States Patent
Gaben (10) Patent No.: US 8,587,907 B2
(45) Date of Patent: Nov. 19, 2013

(54) ELECTRIC BATTERY WITH MULTIPLE ELECTRICAL ENERGY GENERATING ELEMENTS

(75) Inventor: Fabien Gaben, Ecully (FR)

(73) Assignee: Dow Kokam France SAS, Massy (FR)

( * ) Notice: Subject to any disclaimer, the term of this patent is extended or adjusted under 35 U.S.C. 154(b) by 0 days.

(21) Appl. No.: 13/441,707

(22) Filed: Apr. 6, 2012

(65) Prior Publication Data
US 2012/0243130 A1 Sep. 27, 2012

Related U.S. Application Data (63) Continuation of application No. PCT/IB2010/002595, filed on Oct. 8, 2010.

(30) Foreign Application Priority Data

Oct. 8, 2009 (FR) ...................................... 09 04832

(51) Int. Cl.
*H02H 9/00* (2006.01)
(52) U.S. Cl.
USPC .......................................................... 361/54
(58) Field of Classification Search
USPC .......................................................... 361/54
See application file for complete search history.

(56) References Cited

U.S. PATENT DOCUMENTS

| 5,539,351 | A | * | 7/1996 | Gilsdorf et al. ............... 327/379 |
| 5,576,612 | A | | 11/1996 | Garrett et al. |
| 5,650,240 | A | | 7/1997 | Rogers |
| 5,670,861 | A | * | 9/1997 | Nor ................................ 320/118 |
| 5,847,912 | A | * | 12/1998 | Smith et al. ................... 361/93.1 |
| 5,963,080 | A | * | 10/1999 | Miske et al. ................... 327/534 |
| 6,014,013 | A | | 1/2000 | Suppanz et al. |
| 6,034,506 | A | | 3/2000 | Hall |
| 6,046,514 | A | * | 4/2000 | Rouillard et al. ............... 307/77 |
| 6,329,796 | B1 | | 12/2001 | Popescu |
| 6,426,614 | B1 | * | 7/2002 | Guthrie ......................... 323/315 |
| 6,462,596 | B1 | * | 10/2002 | Varma .......................... 327/218 |
| 6,741,437 | B2 | | 5/2004 | Vanhee |
| 7,369,386 | B2 | | 5/2008 | Rasmussen et al. |
| 7,432,613 | B2 | | 10/2008 | Jabaji et al. |
| 2004/0135545 | A1 | | 7/2004 | Fowler et al. |

(Continued)

FOREIGN PATENT DOCUMENTS

| EP | 2051347 A2 | 4/2009 |
| GB | 2375223 A | 11/2002 |
| WO | 2008055505 A1 | 5/2008 |

*Primary Examiner* — Ronald W Leja
(74) *Attorney, Agent, or Firm* — Harness, Dickey & Pierce, PLC (57) ABSTRACT

A lithium-based battery system for a vehicle includes a plurality of lithium battery cells arranged in series that provide energy to propel the vehicle. Each of the battery cells includes a first terminal, a second terminal, a plurality of lithium battery elements arranged in parallel, a plurality of disconnect switches, and a shunt switch. Each of the battery elements includes a first terminal and a second terminal. The first terminal of each of the battery elements is connected to the first terminal of the battery cell. The second terminal of each of the battery elements is connected to the second terminal of the battery cell via a corresponding one of the disconnect switches. The shunt switch is connected between the first and second terminals of the battery cell. A control module selectively opens and closes the shunt switches and the disconnect switches.

19 Claims, 5 Drawing Sheets

(56) References Cited

U.S. PATENT DOCUMENTS

| | | |
|---|---|---|
| 2004/0217737 A1 | 11/2004 | Popescu |
| 2005/0077878 A1 | 4/2005 | Carrier et al. |
| 2005/0083016 A1 | 4/2005 | Yau et al. |
| 2005/0093371 A1* | 5/2005 | Zdziech et al. .............. 307/10.1 |
| 2008/0143239 A1* | 6/2008 | Nishikawa et al. ........... 313/495 |
| 2009/0096421 A1 | 4/2009 | Seman, Jr. |
| 2011/0057617 A1* | 3/2011 | Finberg et al. ................ 320/118 |
| 2012/0070701 A1* | 3/2012 | Gaben .............................. 429/7 |

* cited by examiner

ELECTRIC BATTERY WITH MULTIPLE ELECTRICAL ENERGY GENERATING ELEMENTS

CROSS-REFERENCE TO RELATED APPLICATIONS

This application is a continuation of International Patent Application No. PCT/IB2010/002595, filed Oct. 8, 2010, which claims the benefit and priority of French Patent Application No. 09/04832, filed Oct. 8, 2009. The entire disclosures of the above applications are incorporated herein by reference.

INTRODUCTION

The present technology concerns an electric battery that can be used, for example, for propulsion of electrical vehicles or hybrid motor vehicle propulsion, i.e., vehicles having an electric motor driving the drive wheels combined with an internal combustion engine driving these wheels or possibly other drive wheels.

In particular, the present technology applies to a high degree of hybridization of vehicles which may go as far as complete electrification of the drivetrain. In this case, the batteries do not then merely serve to assist the vehicles in the acceleration phases but also to provide movement of the vehicle over greater or lesser distances.

The electric battery according to the present technology can also find its application in other technical fields; for example, the storage of electrical energy in other modes of transportation, particularly in aeronautics. Moreover, in stationary applications such as for windmills, the securing of a battery according to the present technology can also be advantageously used.

To guarantee the levels of power and/or energy required for the applications in question, it is necessary to create batteries comprising a plurality of electrical energy generating elements, which are mounted in an electricity-generating circuit.

The generating elements conventionally include a sealed envelope, flexible or rigid, which is provided with two terminals for connecting the element to the production circuit. A stack or a winding of electroactive layers acting successively as cathodes and anodes is arranged in the envelope, the layers being put in contact by an electrolyte. In particular, electrochemical elements of the lithium-ion or lithium-polymer type can be used to generate the required electrical energy.

The generating elements can have malfunctions; for example, caused by wear, defective workmanship, or misuse, which can hinder the good functioning of the battery, particularly with respect to safety of use and/or the expected electricity production.

In particular, defective elements can be subjected to a succession of exothermal chemical reactions, which can lead to thermal runaway, which, combined with a gas production inside the sealed envelope, causes a divergent reaction process putting the element at risk of an explosion.

To secure and maintain the batteries in good operational condition, the use of diodes which are arranged to shunt the electric current of a defective element or group of elements, particularly when the latter is beyond a predefined voltage range, is known from the prior art.

However, this solution is quasi-impossible to implement in the context of high power and high energy batteries, which are necessary for the propulsion of motor vehicles; for example, requiring an operating voltage of several hundred volts (generally between 300 volts and 700 volts). Indeed, the energy shunt in the diode is thermally dissipated, and the associated heat production can rapidly become unmanageable when the size of the battery is larger.

An alternative implementation has been proposed in the context of French Publication 2803123 (see related U.S. Pat. No. 6,741,437, Vanhee, issued May 25, 2004), which envisions discharging a defective battery element onto an energy consumer so that, once discharged, it can be short-circuited without risk. However, such an energy consumer causes significant temperature rises as well as delayed securing of the element which can be beyond the securing need. Moreover, this solution does not allow a reversible operating in the sense that a completely discharged battery element becomes permanently non-operational.

Actuators, which may be pyrotechnic, which allow one or several battery elements to be shunted without thermal dissipation and with a short shunting lead-time, for example, on the order of a millisecond, are also known. Therefore, the transitional character of the unwanted phenomenon of short-circuit of the shunted element is improved, which makes it possible to limit the consequences in terms of safety and damage of the element.

Although the risk of short-circuit is minimized by an extreme reduction of the shunting lead-times, when the batteries are larger and their operation voltage is increased, an additional risk of inducing electrical arcs appears during the opening of the electric circuits. The rapidity of the transition times of the pyrotechnic actuators does not make it possible to prevent avoiding these risks of electric arc formation. Moreover, these actuators remain expensive and bulky to install on each of the elements of a high energy battery. Besides, since they can only operate once, their irreversibility does not allow their use in order to secure the battery during maintenance operations.

Moreover, to secure the use of high energy batteries, power contactors are generally connected in series in order to be able to cut off the production circuit. In particular, breakers which can operate manually, known as service-plugs, serve, in theory, to secure the maintenance operations. However, such contactors are expensive, very bulky and are consequently installed only on battery terminals. Consequently, their opening does not prevent the presence of high voltage inside the batteries, nor the short-circuit risks in the batteries Still, concerning safety, it is important to note the importance of the capacity of the battery vis-à-vis its safety behavior. Indeed, batteries and elements are susceptible to having internal short-circuits (resulting from defects of the separator, occurrence of dendrites, presence of metallic impurities, etc.) which can lead to temperature rise localized in the area of these short-circuits, triggering a thermal runaway of the element. One of the most influential factors regarding the management of this risk remains the battery capacity. Indeed, the greater the element capacity, the greater the current density and the local temperature rise will be, thus promoting the start of divergent reactions. Consequently, it is extremely difficult to secure the implementation of high-capacity elements in a battery, whether they be connected in series, as a unit, in the production circuit or grouped in parallel in cells.

Moreover, to guarantee the service life and optimize the autonomy and the functionality of the batteries, it is important for the elements or cells connected in series to be perfectly electrically balanced. Indeed, elements that are too discharged or too charged can be altered so that their service life ends up being shortened, or, in an extreme case, can cause a risk of thermal runaway. At a given temperature, an element having been entirely discharged of its capacity crosses over a voltage threshold, meaning that its capacity has been depleted.

Because of variation in the quality of the products and different dynamics of aging, the intrinsic capacities of the elements can be more or less dispersed. The discharge of the battery will be stopped as soon as the weakest element will have been depleted, that is, will have crossed over a low voltage threshold. Thus, all the energy contained in the elements which have not been completely depleted cannot be used.

Conversely, during recharging, the process will be stopped when one of the elements will have crossed over the high voltage threshold. The battery will then not be completely full, causing a loss of range of the vehicle to be charged. In order to continue charging the battery, the energy contained in the most charged element can be dissipated in a resistor in order to bring its voltage back to the level of that of the other elements. Such a strategy requires time to achieve the balancing level and dissipates energy in the form of heat. This temperature increase can, in addition, pose problems of reliability.

SUMMARY

The present technology aims at overcoming the drawbacks of the prior art by proposing, in particular, a high energy and high power electrical battery, each element of which can be very safely shunted from the production circuit, without interrupting the production of electricity. Moreover, the shunting can be carried out selectively and reversibly in order to avoid the risks related to a defective element, to secure maintenance operations, and to ensure a balancing of the elements or cells connected in series during the charging as well as during the discharging of the battery.

To this end, the present technology proposes an electric battery comprising a plurality of electrical energy generating elements that are mounted in an electricity production circuit, each element being contained in a sealed envelope provided with two terminals for connecting the element to the production circuit. A terminal of each element is connected to a production circuit by a first device for electronically switching the connection of the element to the production circuit, and each element is equipped with a shunting loop which is connected on both sides of the terminals of the element so as to shunt it while maintaining the production circuit closed, the shunting loop being provided with a second device for electronically switching its connection to the production circuit.

Further areas of applicability of the present technology will become apparent from the detailed description provided hereinafter. It should be understood that the detailed description and specific examples are intended for purposes of illustration only and are not intended to limit the scope of the technology.

It should be noted that the figures set forth herein are intended to exemplify the general characteristics of components, methods and devices among those of the present technology, for the purpose of the description of certain embodiments. These figures may not precisely reflect the characteristics of any given embodiment, and are not necessarily intended to define or limit specific embodiments within the scope of this technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Figure 1A:
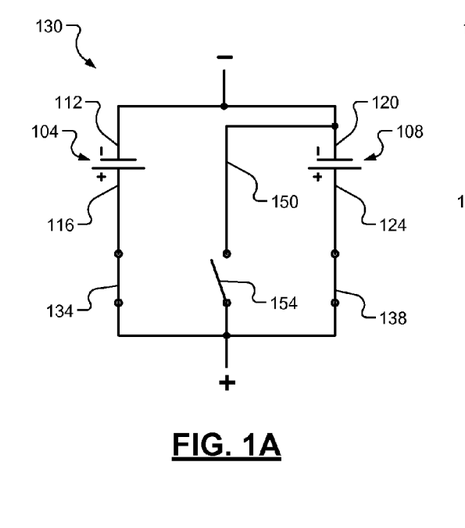
FIGS. 1A-1B show example assemblies of a battery cell in the production circuit of an electric battery according to the present technology.

With respect to FIG. 1A, an electric battery is described that includes a plurality of electrical energy generating elements, such as electrical energy generating elements 104 and 108. While the elements 104 and 108 are shown and described, the electric battery may include a greater number of elements. The elements 104 and 108 are connected in an electricity-producing circuit. In particular, the electrochemistry of the elements 104 and 108 can be lithium-ion or lithium-polymer.

Each of the elements 104 and 108 is contained in a sealed envelope that is provided with two terminals, an anode and a cathode, for connecting that element to the production circuit. For example only, the element 104 includes anode terminal 112 and cathode terminal 116, and the element 108 includes anode terminal 120 and cathode terminal 124. In the envelope, a stack or a winding of electroactive layers acting successively as an anode and a cathode is arranged, the layers being put in contact by an electrolyte. The layers can be contained in a flexible envelope. Alternatively, they can be contained in a rigid container.

According to an implementation, the elements 104 and 108 can be connected in series in the production circuit. According to another implementation, the battery includes a plurality of cells 130 which are connected in series in the production circuit, each of the cells 130 comprising at least two elements 104 and 108 connected in parallel.

In the drawings, the cell 130 includes the two elements 104 and 108 connected in parallel. The cathode terminal 116 of the element 104 may be connected to the production circuit by a first switching device 134 for electrically switching the connection of the element 104 of the production circuit. The cathode terminal 124 of the element 108 may be connected to the production circuit by a second switching device 138 for electrically switching the connection of the element 108 of the production circuit.

Figure 1B:
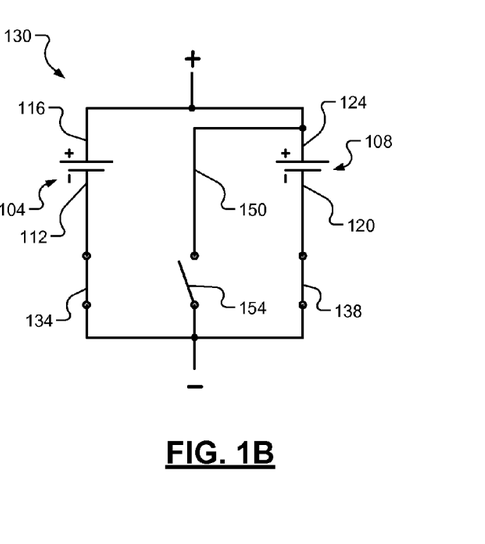

In another implementation, such as the example of FIG. 1B, the anode terminal 112 of the element 104 may be connected to the production circuit by the first switching device 134 for electrically switching the connection of the element 104 of the production circuit. The anode terminal 120 of the element 108 may be connected to the production circuit by the second switching device 138 for electrically switching the connection of the element 108 of the production circuit.

Referring now to FIGS. 1A and 1B, the elements 104 and 108 are equipped with a shunting loop 150. The shunting loop 150 is connected on both sides of the terminals of each of the elements (e.g., the elements 104 and 108) so as to be able to shunt it so the electric current no longer passes through the element, while maintaining the production circuit closed so that the other elements connected to the production circuit can continue to provide the required electricity. In order to be able to shunt an element (e.g., the element 104 and/or 108) of the production circuit, the shunting loop 150 is equipped with a third switching device 154 for electronically switching its connection to the production circuit.

In particular, the first, second, and third switching devices 134, 138, and 154, respectively, allow the connection state of the element 104, of the element 108, and/or of the shunting loop 150 with the production circuit to be modified, particularly to open and close the connection as in the case of a switch. The elements 104 and 108 can also be equipped with separators, ventings, and/or short-circuits, such as those known in the prior art, these devices being able, after shunting, to be activated without the risk of an electrical breakdown since the element is thus electrically isolated.

FIGS. 1A-B show a cell 130 in which the shunting loop 150 is common to the elements 104 and 108 connected in parallel. Alternatively, a shunting loop 150, and therefore a third switching device 154, can be provided for each of the elements 104 and 108 of the cell 130.

The cell 130 is shown in a configuration in which the two elements 104 and 108 supply the production circuit with electricity, namely, in which the first and second switching devices 134 and 138 are closed and the third switching device 154 is open to disconnect the shunting loop 150. The third switching device 154 may be referred to as a shunt switch, and is normally open, while the first and second switching devices 134 and 138 may be referred to as disconnect switches, and is normally closed.

When the shunt switch is closed while the disconnect switches are still closed, a temporary short circuit condition exists. The disconnect switches are therefore opened soon after the shunt switch and/or during a period overlapping a period during which the shunt switch is closed. Although closing the shunt switch first creates a temporary short circuit, opening the disconnect switches first would interrupt the flow of current, and create a surge of current (which may be referred to as an arc) once the shunt switch was closed.

Once the shunt switch is closed, all of the disconnect switches are opened to eliminate the short circuit condition. Although a single disconnect switch common to all of the elements in a cell could eliminate the short circuit condition, the single disconnect switch could not isolate the elements from each other. This prevents adverse reactions between the elements, such as discharging from one element to another. As a result, each of the elements may include, as shown in the drawings, its own disconnect switch. Therefore, in various implementations, all of the disconnect switches for a cell are opened if any one of the disconnect switches for the cell is opened. Again, the shunt switch would be closed prior to the disconnect switches being opened.

According to various implementations (e.g., FIGS. 2A-5B), the first, second, and third switching devices 134, 138, and 154, respectively, each include more than one switching device, which may be diodes, metal-oxide semiconductor field-effect transistors (MOSFETs), bipolar junction transistors (BJTs), insulated gate bipolar transistors (IGBTs), and thyristors. The first, second, and third switching devices 134, 138, and 154, respectively, can be of an identical or different nature.

Figure 2A:
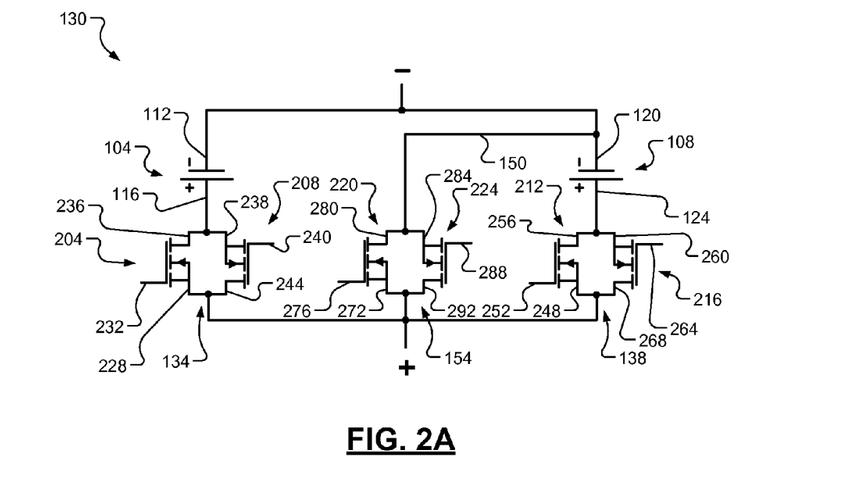
FIGS. 2A-2C are functional schematics of a battery cell in the production circuit of an electric battery according to the present technology.
Figure 2B:
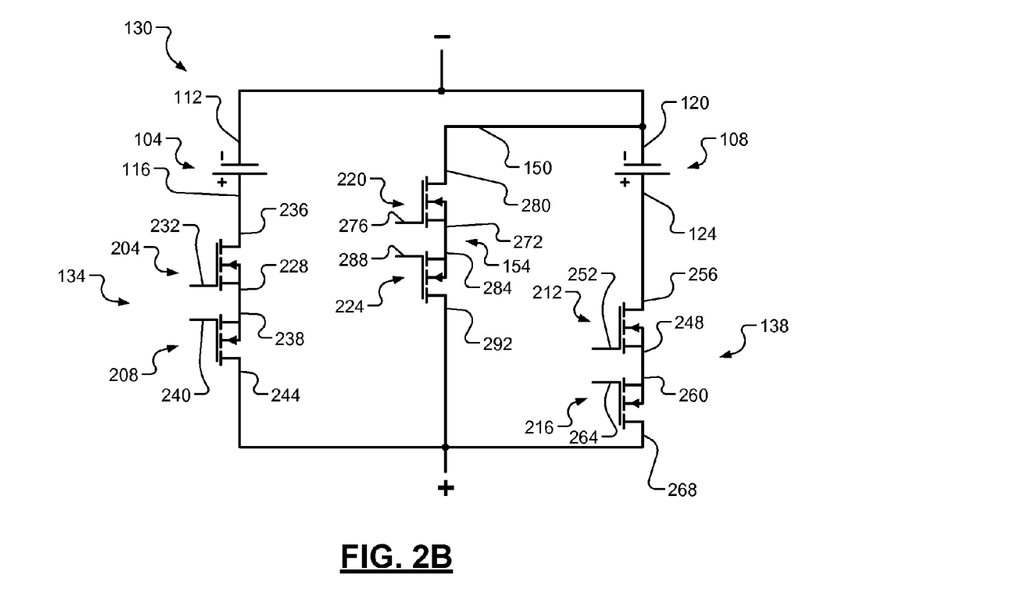
Figure 2C:
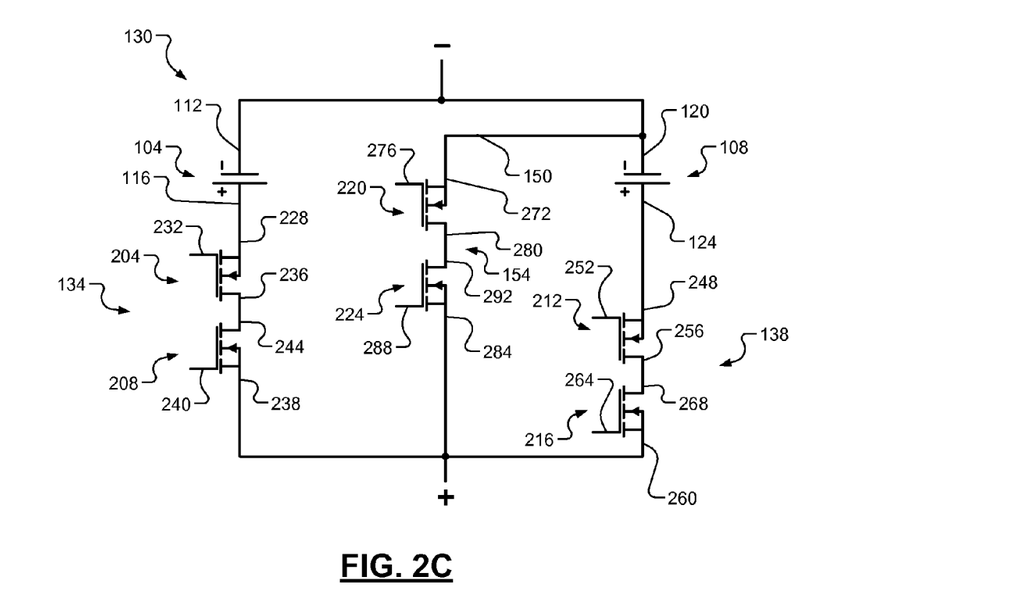

In particular, as shown in the examples of FIGS. 2A-2C, the first, second, and third switching devices 134, 138, and 154, respectively, can each include a pair of MOSFETs. For example only, the first switching device 134 can include MOSFETs 204 and 208. The second switching device 138 can include MOSFETs 212 and 216. The third switching device 154 can include MOSFETs 220 and 224. For example only, each of the MOSFETs 204, 208, 212, 216, 220, and 224 may be an n-channel, enhancement mode power MOSFET. Alternatively or additionally, p-channel MOSFETs, depletion mode MOSFETs, lateral MOSFETs, etc., can be used.

Each of the MOSFETs 204, 208, 212, 216, 220, and 224 includes a body, a source terminal, a gate terminal, and a drain terminal. Specifically, the MOSFET 204 includes a source terminal 228, a gate terminal 232, and a drain terminal 236. The MOSFET 208 includes a source terminal 238, a gate terminal 240, and a drain terminal 244. The MOSFET 212 includes a source terminal 248, a gate terminal 252, and a drain terminal 256. The MOSFET 216 includes a source terminal 260, a gate terminal 264, and a drain terminal 268. The MOSFET 220 includes a source terminal 272, a gate terminal 276, and a drain terminal 280. The MOSFET 224 includes a source terminal 284, a gate terminal 288, and a drain terminal 292.

In an implementation, such as in the example of FIG. 2A, each pair of MOSFETs can be connected in an anti-parallel configuration. More specifically, each pair of MOSFETs can be connected such that the drain terminal of one of the MOSFETs is connected to the source terminal of the other one of the MOSFETs, and the drain terminal of the other one of the MOSFETs is connected to the source terminal of the one of the MOSFETs. For example only, the source terminal 228 and the drain terminal 236 can be connected to the drain terminal 244 and the source terminal 238, respectively. The source terminal 248 and the drain terminal 256 can be connected to the drain terminal 268 and the source terminal 260, respectively. The source terminal 272 and the drain terminal 280 can be connected to the drain terminal 292 and the source terminal 284, respectively. Thus, the MOSFETs 204, 208, 212, 216, 220, and 224 being unidirectional, an element (e.g., element 104 and/or 108) can be disconnected while allowing the current to pass in both directions, during the charge and during the discharge of the element, respectively.

In the example of FIG. 2A, the first switching device 134 and/or the second switching device 138 can include a MOSFET and a diode (not shown) connected in parallel, the diode replacing a MOSFET in order to reduce costs. The diode which is used can be, in particular, of the type without external control, which means that it is configured to open the connection in the shunting loop 150 beyond a voltage threshold, for example on the order of 0.6 V.

In another implementation, such as the example of FIG. 2B, each pair of MOSFETs can be connected in series, source terminal to source terminal. More specifically, each pair of MOSFETs can be connected such that the source terminal of one of the MOSFETs is connected to the source terminal of the other one of the MOSFETs. For example only, the source terminal 228 can be connected to the source terminal 238. The source terminal 248 can be connected to the source terminal 260. The source terminal 272 can be connected to the source terminal 284.

In yet another implementation, such as the example of FIG. 2C, each pair of MOSFETs can be connected in series, drain terminal to drain terminal. More specifically, each pair of MOSFETs can be connected such that the drain terminal of one of the MOSFETs is connected to the drain terminal of the other one of the MOSFETs. For example only, the drain terminal 236 can be connected to the drain terminal 244. The drain terminal 256 can be connected to the drain terminal 268. The drain terminal 280 can be connected to the drain terminal 292.

Figure 3A:
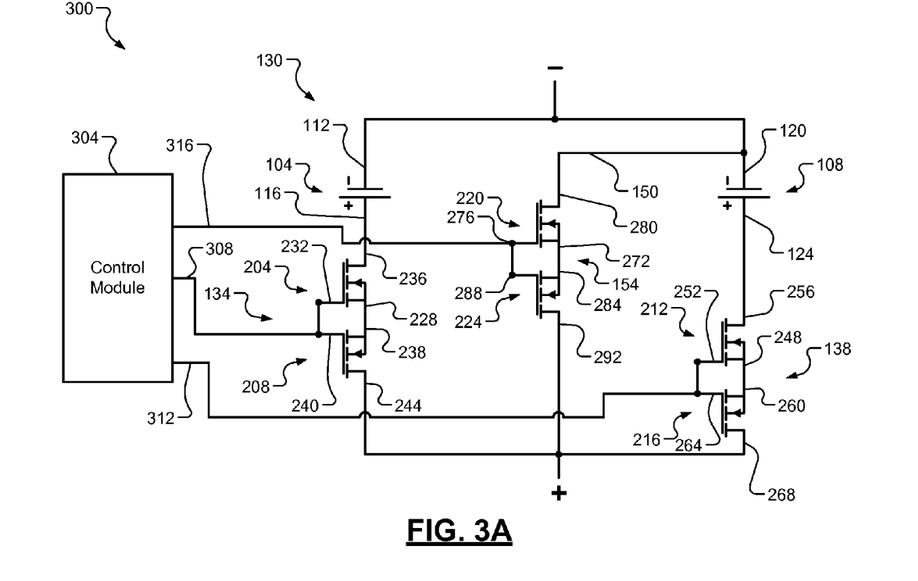
FIGS. 3A-3B are functional block diagrams of example battery systems, each including an example implementation of a battery cell according to the present technology.
Figure 3B:
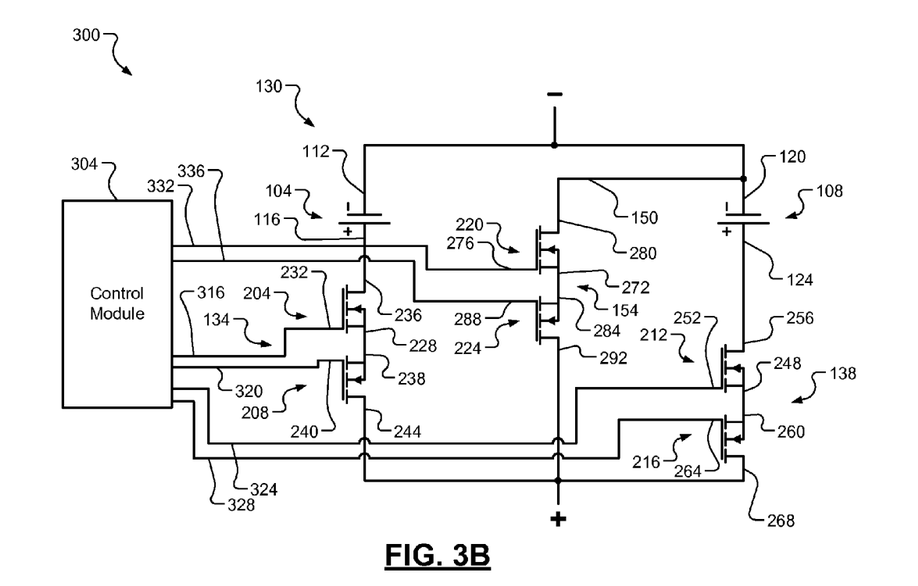

Referring now to FIGS. 3A-3B, a reversible control system 300 may include a control module 304 and the battery, which includes a plurality of cells, such as the cell 130. The reversible control system 300 is shown in conjunction with the pairs of MOSFETs 204, 208, 212, 216, 220, and 224 of the first, second, and third switching devices 134, 138, and 154, respectively, connected in series. However, the reversible control system 300 is also applicable to implementations where the pairs of the MOSFETs 204, 208, 212, 216, 220, and 224 are connected in parallel, source terminal to drain terminal, and implementations where the pairs of MOSFETs 204, 208, 212, 216, and 224 are connected in series, drain terminal to drain terminal.

The first, second, and third switching devices 134, 138, and 154, respectively, enable one or more of the elements 104 and 108 to be selectively shunted while maintaining the production circuit closed. In particular, the shunting of an element (e.g., element 104 or 108) includes the closing of the third switching device 154, then opening the associated one of the first or second switching devices 134 or 138, respectively. According to an implementation, the shunting of an element (e.g., element 104 or 108) can be accompanied with the shunting of all the other elements of the cell 130—i.e., the opening of all the switching devices associated with the other elements of the cell 130.

Using the first, second, and third switching devices 134, 138, and 154, respectively, and particularly the MOSFETs 204, 208, 212, 216, 220, and 224, can allow an extremely fast opening/closing of the connections, for example a duration on the order of a few microseconds, which provides for a transitional and extremely fast setting into short-circuit of the elements (e.g., elements 104 and/or 108).

In an implementation, such as the example of FIG. 3A, the control module 304 may control switching of the MOSFETs 204, 208, 212, 216, 220, and 224 in pairs. For example only, the control module 304 may control switching of the MOSFETs 204 and 208 via a switching control signal 308 applied at the gate terminals 232 and 240 of the MOSFETs 204 and 208, respectively. The control module 304 may control switching of the MOSFETs 212 and 216 via a switching control signal 312 applied at the gate terminals 252 and 264 of the MOSFETs 212 and 216, respectively. The control module 304 may control switching of the MOSFETs 220 and 224 via a switching control signal 316 applied at the gate terminals 276 and 288 of the MOSFETs 220 and 224, respectively.

In another implementation, such as the example of FIG. 3B, the control module 304 may control switching of the MOSFETs 204, 208, 212, 216, 220, and 224 individually. For example only, the control module 304 may control switching of the MOSFET 204 via a switching control signal 316 applied at the gate terminal 232 of the MOSFET 204. The control module 304 may control switching of the MOSFET 208 via a switching control signal 320 applied at the gate terminal 240 of the MOSFET 208. The control module 304 may control switching of the MOSFET 212 via a switching control signal 324 applied at the gate terminal 252 of the MOSFET 212. The control module 304 may control switching of the MOSFET 216 via a switching control signal 328 applied at the gate terminal 264 of the MOSFET 216. The control module 304 may control switching of the MOSFET 220 via a switching control signal 332 applied at the gate terminal 276 of the MOSFET 220. The control module 304 may control switching of the MOSFET 224 via a switching control signal 336 applied at the gate terminal 288 of the MOSFET 224.

In an implementation where the control module 304 controls switching of the MOSFETs 204, 208, 212, 216, 220, and 224 individually, the switching control signals 316, 320, 324, 328, 332, and 336 used to switch the MOSFETs 204, 208, 212, 216, 220, and 224, respectively, may be the same or of different magnitudes. The control module 304 may generate the switching control signals 316, 320, 324, 328, 332, and 336 associated with the pair of the MOSFETs 204, 208, 212, 216, 220, and 224 such that the individual MOSFETs 204, 208, 212, 216, 220, and 224 of the pair are switched at the same time or at different times. For example only, with respect to the MOSFETs 204 and 208, the control module 304 may generate the switching control signals 316 and 320 to accomplish switching of the MOSFETs 204 and 208 at the same time or at different times. If generating the switching control signals 316 and 320 to accomplish switching of the MOSFETs 204 and 208 at different times, the control module 304 may generate the switching control signals 316 and 320 to switch the MOSFETs 204 and 208 in a predetermined order. The predetermined order may be selected based on whether charging of the element 104 or discharging of the element 104 is to be performed.

Figure 4:
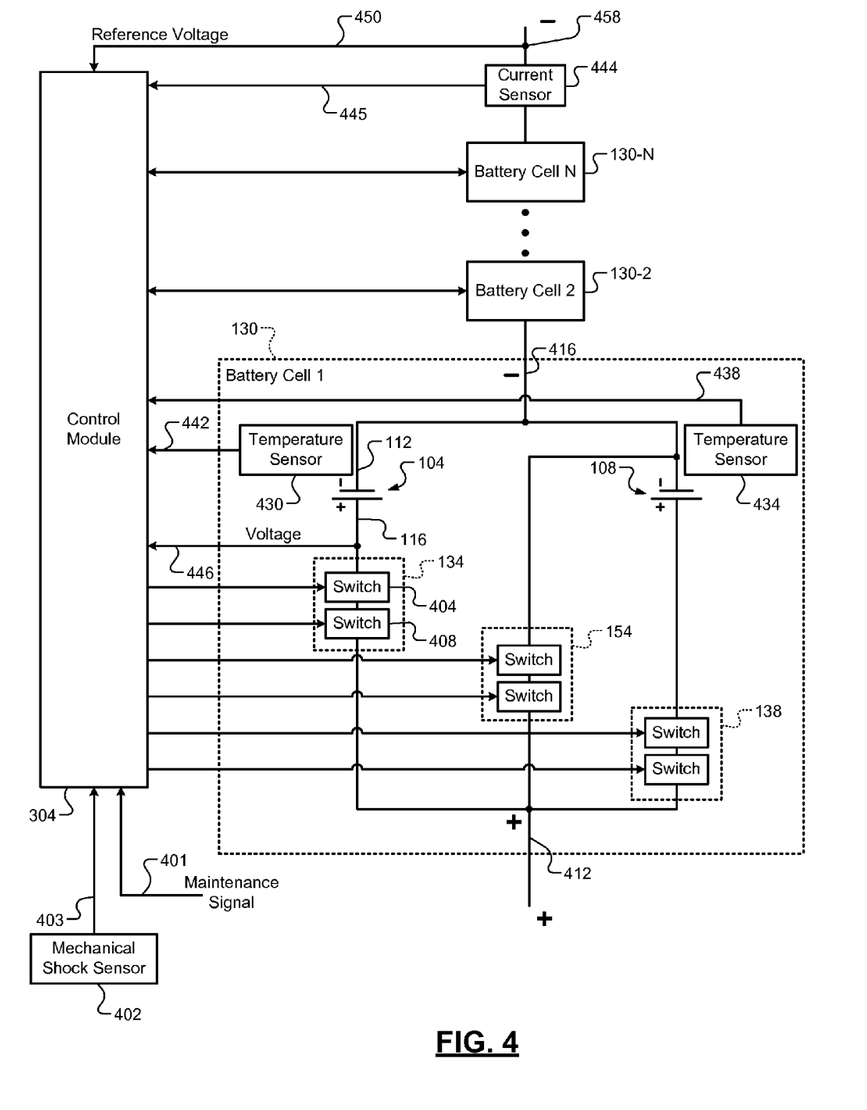
FIG. 4 is a functional block diagram of an example battery system including an example implementation of a battery cell according to the present technology.

Referring now to FIG. 4, according to an implementation, the control module 304 includes a function for reversibly shunting all of the elements of the cell 130. In particular, this function can be activated when one or more conditions occur. For example only, this function can be activated in order to allow maintenance of the battery by eliminating any source of voltage. A maintenance signal 401 may be input when maintenance of the battery is to be performed.

Moreover, this function can be activated after the detection of a shock that could affect the battery. In particular, in the case of a battery configured to the propulsion of a motor vehicle, the detected shock can concern an accident of the vehicle, in particular a crash, which could affect the mechanical integrity of the battery. Thus, any risk of electrocution of medical emergency responders by contact with the high voltage of the battery, as well as the risks of a fire, may be reduced.

For example only, a shock that could affect the battery may be detected using a mechanical shock sensor 402. The mechanical shock sensor 402 may generate a shock signal

403 that indicates whether the mechanical shock sensor 402 has detected a shock that could affect the battery. For example only, the mechanical shock sensor 402 may include an accelerometer, and the mechanical shock sensor 402 may generate the shock signal 403 when acceleration is greater than a predetermined acceleration.

According to an implementation, the battery implements a monitoring system to detect occurrence of an excessive temperature of at least one of the plurality of cells 130, 130-2, ..., 130-N (collectively referred to as cells 130, where N is an integer greater than or equal to two) connected in series, cathode to anode.

Each of the cells 130 includes a plurality of elements. For example only, the cell 130 includes the elements 104 and 108 and may include one or more additional elements. One or more switches are associated with each of the elements. For example only, switches 404 and 408 may be connected in series between the cathode terminal 116 of the element 104 and a cathode terminal 412 of the cell 130. The elements are connected in series between the associated switches and the anode terminal of the cell 130. For example only, the element 104 is connected at its anode terminal 112 to an anode terminal 416 of the cell 130 and at its cathode terminal 116 to the switches 404.

For example only, excessive temperature of a cell may be detected using a temperature sensor. Each of the cells 130 may include one or more temperature sensors. For example only, the cell 130 may include temperature sensors 430 and 434 associated with the elements 104 and 108, respectively. The temperature sensors 430 and 434 measure a temperature of the elements 104 and 108 and generate temperature signals 438 and 442 based on the measured temperatures, respectively. The control module 304 may detect excessive temperature, for example, when the temperature measured by the temperature sensor 430 is greater than a predetermined temperature. The monitoring system is configured to actuate the control system to shunt at least one element when excessive temperature is present.

According to an implementation, the battery includes a monitoring system for the occurrence of excessive current flow through the cells 130. For example, excessive current flow through the cells 130 may be detected using a current sensor 444. The current sensor 444 measures current through the cells 130 and generates a current signal 445 based on the measured current. The control module 304 may detect the presence of excessive current, for example, when the measured current is greater than a predetermined current. The monitoring system is configured to actuate the control system to shunt at least one element when excessive current is present.

According to an implementation, the control module 304 is configured to detect a malfunction, such as a short circuit, of one or more elements (e.g., the element 104 or 108) of at least one of the plurality of cells 130. The control module 304 is configured to shunt at least one element when a malfunction occurs in the element.

The securing of the battery operation can be carried out by watching for the occurrence of a malfunction of the elements. If a malfunction of an element is detected, the control module 304 actuates the shunting of the defective element so the electrical current no longer passes through the defective element while maintaining the production circuit closed.

The detection of a malfunction makes it possible to rapidly actuate the shunting of the defective element in order to electrically isolate the defective element from the production circuit. Therefore, as soon as a malfunction appears, the defective element is no longer electrically biased so as, in particular, to prevent a worsening of the malfunction. In particular, thermal runaway within a defective element is thus avoided. Moreover, the electrical production of the battery is thus not interrupted, which can, for example, afford a driver more time to exit traffic after a battery malfunction.

According to a securing strategy, in case of a malfunction of an element (e.g., the element 104 or 108) of a cell (e.g., the cell 130), the shunting of all the elements of the cell is actuated, in order to prevent the risks of an over-discharge of the elements or of inversion of one of the elements of the cell.

Therefore, when an element of a cell is defective, the battery is secured by compartmentalizing the energy contained in each of the elements connected in parallel in case of an internal short-circuit and by preventing the formation of electrical arcs, electrical breakdowns, which could give rise to risks of thermal runaways when they occur in the cell.

Such a strategy therefore makes it possible to cut the electrical connections between elements connected in parallel, which limits the risk of triggering a divergent process when a short-circuit occurs on one of the elements of a cell.

According to an implementation, the battery includes a monitoring system of the state of charge of at least one element of at least one of the cells 130. For example only, state of charge of the element 104 may be monitored using an element voltage 446, a reference voltage 450, and/or the current signal 445 through the cells 130, the element voltage 446 being taken at the cathode terminal 116 of the element 104, and the reference voltage 450 being taken at an input terminal 458 to the cells 130. The monitoring system being configured to actuate the control system so as to shunt, as a function of their state of charge, at least one element, particularly elements or cells connected in series. For example only, the monitoring system may actuate the control system when a charge level of the elements of a cell becomes greater than or equal to a predetermined maximum charge level during charging or when the charge level becomes less than or equal to a predetermined minimum charge level during discharging.

Therefore, the reversible system for controlling the first, second, and third switching devices 134, 138, and 154, respectively, can be put to good use to balance the battery without losing energy, consequently making it more autonomous. Indeed, being able to shunt one or all of the elements can also be put to good use to carry out an electrical balancing of the battery without dissipating energy through a resistor.

In particular, the elements or the cells connected in series having the highest voltages can be successively shunted during the recharge phase. This management strategy makes it possible to preserve an operational voltage of the battery that is coherent with the operation range of the charger while ensuring that not too great a number of elements or cells are simultaneously shunted. This shunting of an element or cell can be done during the charge of the other elements or cells of the battery and makes it possible to keep the durations of balancing short.

Similarly, the weakest elements or cells can be shunted during the discharge so as to bias more of the cells containing the most energy with the goal of all cells converging at 0% state of charge (SOC) at the end of the discharge. This management thus makes it possible to augment the energy used in the battery without triggering losses by thermal dissipation effects.

Moreover, the reversible system for controlling the first, second, and third switching devices 134, 138, and 154, respectively, can be put to good use to adapt the voltage of the battery by shunting more or fewer elements of the production circuit.

The battery of the present technology allows for a real securing of its operation, particularly in relation to high energy Li-ion batteries, whether in configurations of daily use of the maintenance type, or in the case of malfunctions. In particular, the securing can be reversible and the selective shunting allows, during the charge, balancing operations to be carried out without thermal dissipation and without requiring the maximum state of charge of an element or a cell to have been reached before it is triggered.

The present technology also allows the differences in capacity between the elements during phases of use to be compensated without dissipating energy and while maximizing the quantity of energy available in the battery. Moreover, in case of shunting, the current can no longer run between the elements, which contributes to securing the use of high capacity elements, the energy implicated in the unwanted event is then confined to the energy contained in a single element, which prevents worsening the risks of thermal runaway.

Also, the battery according to the present technology makes it possible to make going downhill with a full charge secure, the shunting of one or several elements being able to function as a complement to software limitations to prevent the surcharge of an element in case of uncontrolled regeneration. It also allows electrical and hybrid vehicles to be secured in case of a crash in the sense that the shunting of all the elements of the battery when crash information is received makes it possible to eliminate the high voltage even inside the battery, which reduces the risk of the damaged vehicle catching on fire and the risk of electrocution.

Figure 5A:
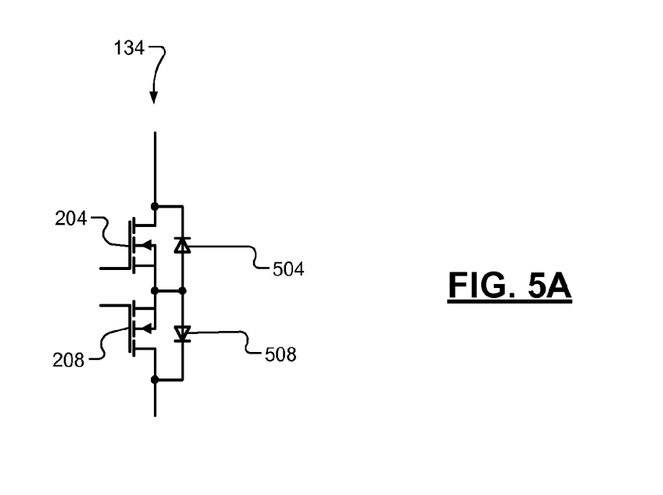
FIGS. 5A-5B are functional schematics of example switches according to the present technology.
Figure 5B:
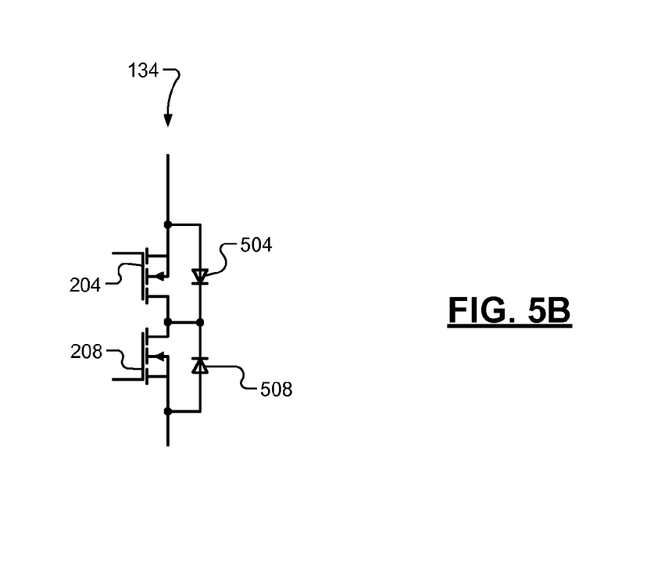

FIGS. 5A and 5B include example diagrams of the first switching device 134 of FIGS. 2B and 2C, respectively. While switching of the first switching device 134 will be discussed, the concepts below are also applicable to switching of the second switching device 138 and the third switching device 154.

A body diode may be inherent to each of the MOSFETs 204 and 208, such as when the MOSFETs 204 and 208 are power MOSFETs. Each diode has a cathode and an anode, and can be described as allowing current flow from the anode to the cathode while blocking current flow from the cathode to the anode. The circuit symbol for the diode uses an arrow to indicate the direction in which current is allowed to flow. In an n-channel power MOSFET, the body diode may allow current to flow from the source to the drain of the MOSFET.

For example, the semiconductor structure of the MOSFET 204 may inherently create body diode 504, which allows current to flow from the source of the MOSFET 204 to the drain of the MOSFET 204. Similarly, the MOSFET 208 may inherently include body diode 508, which allows current to flow from the source of the MOSFET 208 to the drain of the MOSFET 208. Because the MOSFETs 204 and 208 are connected in series but in reversed orientations, the body diodes 504 and 508 together block current going in either direction. With only a single MOSFET, current could be blocked in one direction only, as the inherent body diode would allow current to flow in the other direction, regardless of whether the MOSFET was on or off.

While in FIG. 5A, the sources of the MOSFETs 204 and 208 are connected, in FIG. 5B, the drains of the MOSFETs 204 and 208 are connected. In both FIGS. 5A and 5B, because the inherent body diodes block current flow in opposite directions, turning off the MOSFETs is sufficient to block current flow in both directions.

Referring to FIGS. 5A and 5B, the control module 304 may switch one of the MOSFETS 204 and 208 on or off prior to switching the other one of the MOSFETS 204 and 208 on or off. For example, when closing the first switching device 134, the MOSFETs 204 and 208 will both be turned on. However, the order of turning the MOSFETs 204 and 208 on may be controlled based on a direction of expected current flow. For example, the direction of current flow for charging may be opposite of the direction of current flow for discharging.

Similarly, when opening the first switching device 134, the MOSFETs 204 and 208 may both be turned off. However, the order of turning the MOSFETs 204 and 208 off may be controlled based on the present direction of current flow. Again, the present direction of current flow may be opposite for charging compared to discharging.

The order of switching the MOSFETs 204 and 208 may be chosen in order to prevent current from flowing through the body diodes 504 and 508. For example only, current flow through the body diodes 504 and 508 may reduce the longevity of the MOSFETs 204 and 208, respectively, and/or may increase power loss.

Using FIG. 5A as an example, assume that the MOSFETs 204 and 208 are on, and current is flowing in the direction allowed by the body diode 508 (i.e., top to bottom in the drawing, or, from the drain of the MOSFET 204 to the drain of the MOSFET 208). In various implementations, little or no current is flowing through the body diode 508 because the resistance presented by the body diode 508 is greater than the on-resistance of the MOSFET 208.

However, if the MOSFET 208 is turned off (while the MOSFET 204 remains on), the resistance of the MOSFET 208 increases toward infinity, and the current that was flowing through the MOSFET 208 will now flow through the body diode 508. By contrast, if the MOSFET 204 is turned off first (while the MOSFET 208 remains on), the MOSFET 204 stops current flow, and the body diode 504 does not allow current flow. The MOSFET 208 can then be turned off with no risk of current flowing through the body diode 508.

A rule can then be generalized: when opening a switching device where current is presently flowing in a first direction, first turn off the transistor whose body diode does not allow current to flow in the first direction. This rule applies to both the configurations of FIGS. 5A and 5B and to current that is flowing in either direction (charging or discharging).

A similar analysis can be performed for when the first switching device 134 is closed. Again using FIG. 5A as an example, assume that the MOSFETs 204 and 208 are off, but once turned on, current will flow in the direction allowed by the body diode 508 (i.e., top to bottom). If the MOSFET 204 is turned on first, current can flow through the MOSFET 204. Although the MOSFET 208 is turned off, the body diode 508 allows current to flow in this direction, and current will flow through the MOSFET 204 and the body diode 508.

By contrast, if the MOSFET 208 is turned on first, no current will flow because the MOSFET 204 is turned off and the body diode 504 does not allow current flow in this direction. Then, when the MOSFET 204 is turned on, current will flow through the MOSFET 204 and then through the MOSFET 208, without shunting through the body diode 508.

Another rule can then be generalized: when closing a switching device where once closed, current will flow in a first direction, first turn on the transistor whose body diode allows current to flow in the first direction, and then turn on the other transistor. This rule applies to both the configurations of FIGS. 5A and 5B and to current that is flowing in either direction (charging or discharging). In various implementations, closing a switching device normally applies to shunt switches, while opening a switching device normally applies to disconnect switches.

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested. Equivalent changes, modifications and variations of embodiments, materials, compositions and methods can be made within the scope of the present technology, with substantially similar results.

For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present technology.

As used herein, the word "include" and its variants are intended to be non-limiting, such that recitation of an included item not to the exclusion of other like items that may also be useful in the components, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

What is claimed is:

1. A lithium-based battery system for a vehicle, the battery system comprising:
   a plurality of lithium battery cells arranged in series that provide energy to propel the vehicle, wherein each of the battery cells comprises:
   a first terminal and a second terminal;
   a plurality of lithium battery elements arranged in parallel, wherein each of the battery elements comprises a first terminal and a second terminal, and wherein the first terminal of each of the battery elements is connected to the first terminal of the battery cell;
   a plurality of disconnect switches, wherein the second terminal of each of the battery elements is connected to the second terminal of the battery cell via a corresponding one of the disconnect switches; and
   a shunt switch connected between the first and second terminals of the battery cell; and
   a control module that selectively opens and closes the shunt switches and the disconnect switches.

2. The battery system of claim 1 wherein each of the disconnect switches and the shunt switches comprises first and second semiconductor switches.

3. The battery system of claim 2 wherein, for each of the disconnect switches and the shunt switches, the control module controls the first and second semiconductor switches simultaneously.

4. The battery system of claim 2 wherein the first and second semiconductor switches are connected in series and comprise first and second transistors, respectively.

5. The battery system of claim 4 wherein, when closing one of the shunt switches, the control module turns on the first transistor of the one of the shunt switches prior to turning on the second transistor of the one of the shunt switches.

6. The battery system of claim 4 wherein, when opening one of the disconnect switches, the control module turns off the first transistor of the one of the disconnect switches prior to turning off the second transistor of the one of the disconnect switches.

7. The battery system of claim 4 wherein the first and second transistors are metal oxide semiconductor field effect transistors (MOSFETs) each having a body, a source, a gate, and a drain, and wherein one of (i) the source of the first transistor is connected to the source of the second transistor and (ii) the drain of the first transistor is connected to the drain of the second transistor.

8. The battery system of claim 7 wherein the first and second transistors are n-channel power MOSFETs and, for each transistor of the first and second transistors, the body of the transistor is connected to the source of the transistor.

9. The battery system of claim 7 wherein the first transistor includes an inherent body diode that allows current flow in a first direction and blocks current flow in a second direction, and wherein the second transistor includes an inherent body diode that allows current flow in the second direction and blocks current flow in the first direction.

10. The battery system of claim 9 wherein when closing one of the shunt switches, the control module first turns on the one of the first and second transistors that includes the inherent body diode that allows current to flow in a direction of expected current flow through the one of the shunt switches.

11. The battery system of claim 9 wherein when opening one of the disconnect switches, the control module first turns off the one of the first and second transistors that includes the inherent body diode that blocks current flow in a direction of present current flow through the one of the disconnect switches.

12. The battery system of claim 1 wherein the control module controls opening and closing of the shunt switches and the disconnect switches to decrease power lost to heat and to prevent damaging short circuit conditions and arcing.

13. The battery system of claim 1 wherein prior to opening the disconnect switches for one of the battery cells, the control module closes the shunt switch for the one of the battery cells.

14. The battery system of claim 13 wherein the control module opens the disconnect switches for one of the battery cells when at least one of:
- a charge level of the battery elements of the one of the battery cells reaches an upper limit during charging;
- a charge level of the battery elements of the one of the battery cells reaches a lower limit during discharging; and
- a temperature of one of the battery elements of the one of the battery cells exceeds a temperature threshold.

15. The battery system of claim 13 wherein, when malfunction of one of the battery elements is detected, the control module opens the disconnect switches for the battery cell comprising the one of the battery elements.

16. The battery system of claim 13 wherein the control module selectively opens the disconnect switches for at least one of the battery cells to regulate an aggregate output voltage of the battery cells.

17. The battery system of claim 13 wherein the control module opens the disconnect switches for all of the battery cells when at least one of:
- a current through the battery cells is greater than a current threshold;
- a maintenance signal is received; and
- a collision of the vehicle is detected.

18. An electric vehicle power system comprising:
the battery system of claim 1; and
a mechanical shock sensor that generates a shock signal when a mechanical shock is detected,
wherein the control module closes the shunt switches when the shock signal exceeds a predetermined threshold.

19. The electric vehicle power system of claim 18 wherein the mechanical shock sensor comprises an accelerometer.

* * * * *